3,479,335
REACTION PRODUCTS OF RIBOFLAVIN WITH FORMALDEHYDE AND PROCESS FOR PREPARING SAME
Joseph W. Blaszczak, 34-43 60th St., Woodside, N.Y. 11377
No Drawing. Continuation-in-part of application Ser. No. 256,539, Feb. 6, 1963. This application May 25, 1965, Ser. No. 458,759
Int. Cl. C07d 57/32; A61k 27/00
U.S. Cl. 260—211.3     6 Claims

ABSTRACT OF THE DISCLOSURE

Valuable reaction products of riboflavin and formaldehyde are produced under non-alkaline reaction conditions. They have a normalizing effect on abnormal cell metabolism.

---

The present application is a continuation-in-part of copending application Ser. No. 256,539, filed Feb. 6, 1963, and now abandoned, and entitled Reaction Products of Vitamins and Process of Making and Using Same.

The present invention relates to new reaction products of formaldehyde with riboflavin and/or ribose and to pharmaceutical compositions containing such reaction products which are able to restore the structure and function of normal cells to pathologically affected cells, and to a process of making and using such compounds and compositions.

It is one object of the present invention to produce a therapeutic preparation which may furnish the precursors for ribonucleoprotein synthesis.

It is another object of the present invention to provide valuable compounds which have a normalizing effect on abnormal cell metabolism.

Another object of the present invention is to provide a simple and effective process of producing such valuable compounds.

A further object of the present invention is to provide a simple and effective process of preparing such new and valuable pharmaceutical compositions.

Still another object of the present invention is to provide new and valuable compositions which contain such compounds and are capable of normalizing abnormal cell metabolism.

A further object of the present invention is to provide an effective method of treating disturbances and disorders of the cell metabolism with the purpose of restoring the normal structure and function to improperly functioning cells.

Another object of the present invention is to provide a new and valuable reaction product of riboflavin and formaldehyde.

Still another object of the present invention is to provide new and valuable reaction products of ribose with formaldehyde.

Other object of the present invention and advantageous features thereof will become apparent as the description proceeds.

In principle the present invention comprises the reaction of water-soluble vitamins, and more particularly, of riboflavin, with formaldehyde in aqueous solution.

Surprisingly it was found that such reaction products and compositions containing the same are capable of restoring the normal metabolism to cells.

To carry out the reaction, the reactants, i.e. the water-soluble vitamin riboflavin or ribose are mixed in aqueous solution preferably with an excess of formaldehyde or formaldehyde-yielding compounds such as paraformaldehyde. Preferably a concentrated aqueous formaldehyde solution, for instance, a solution containing 40% of formaldehyde is used. It is, however, also possible to employ less concentrated formaldehyde solutions, gaseous formaldehyde, or solid polymeric paraformaldehyde. According to the present invention reaction between the vitamin and formaldehyde is effected at increased temperature, preferably at a temperature exceeding 100° C. Activators which accelerate the reaction may be added. Especially advantageous activation is effected by the addition of ferrous sulfate. After the reaction is completed, excess formaldehyde is removed by repeated concentration of the reaction mixture by evaporation.

Compounds according to the present invention are also obtained by the interaction of polymerized formaldehyde with riboflavin and/or ribose in the presence of water which participates in the reaction. Aqueous formaldehyde solution polymerizes in two ways:

(a) Spontaneously with the precipitation of paraformaldehyde which is a mixture of polyoxymethylenes of the linear formula —$CH_2$—O—$CH_2$—O—$CH_2$—O—, or (b) Under the influence of activators with the formation of polyhydroxy aldehydes, i.e. sugars called formoses of the formula

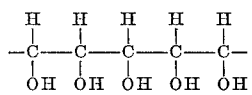

The polymerization of formaldehyde involves the formation of hydrated ions which possess a high degree of stability and are extremely reactive. These ions form stable methylene ethers which are called formals with formoses, riboflavin, or ribose. At the temperature above 100° C. these ethers form crystals visible with the naked eye.

The resulting reaction mixtures may be diluted and administered as such or it may be evaporated to dryness, preferably by freeze drying, and the resulting powder may be administered as such or after conversion into shaped preparations such as tablets, pills, dragees, etc. The powder may also be redissolved in water to the desired concentration and employed in this manner.

Compositions containing the new compound are preferably administered orally. They are highly stable even on prolonged storage, substantially nontoxic, and are well tolerated without producing any side-effects in the therapeutic doses given.

The following examples serve to illustrate the present invention without limiting the same thereto.

EXAMPLE 1

A mixture of 20 g. of riboflavin, 10 g. of thiamine hydrochloride, 80 g. of nicotinic acid amide, is mixed with 400 cc. of a 5% aqueous formaldehyde solution. The mixture is heated under reflux in the boiling water bath until a clear transparent solution is obtained. The reaction mixture is cooled. 92 g. of ribose, 25 g. of lactose, and 10 g. of ferrous sulfate, and distilled water in an amount sufficient to yield a volume of about 900 cc. are added thereto and the mixture is again heated under reflux to about 100° C. for 30 minutes to one hour. The resulting solution is made up with sterile distilled water to a volume of 1000 cc. The pH of the final composition is about 5.0

EXAMPLE 2

One g. of riboflavin is reacted with 10 cc. of a 40% formaldehyde solution by boiling the mixture. Thereby, a transparent, orange solution is formed. This solution is diluted with water to twice its volume. To remove excess formaldehyde, half of the resulting dilution is evaporated. If the odor of formaldehyde does not disappear, this procedure of diluting the concentrate with water to twice its volume and evaporating half of the resulting dilution is repeated until the odor of formaldehyde has completely disappeared. The pH of this liquid preparation is about 3.0.

That a new reaction product of riboflavin with formaldehyde is formed, is proved by the considerable increase in solubility of the reaction product. While one g. of riboflavin requires at least 3000 cc. of water to form an aqueous solution, one g. of the new reaction product is readily soluble in water at room temperature.

EXAMPLE 3

One g. of riboflavin is heated to boiling in 10 cc. of a 40% formaldehyde solution until dissolved. The solution is concentrated by evaporation to one third of its volume. On cooling said concentrate to room temperature, a gel is formed which liquifies on heating. In order to remove excess formaldehyde therefrom, water is added to the gel in an amount to yield the initial volume. This solution is again concentrated by evaporation to one third of its volume and addition of water and concentration is repeated until the formaldehyde odor has completely disappeared. The resulting formaldehyde-free gel is therapeutically administered after dilution with water to the desired concentration.

EXAMPLE 4

One g. of riboflavin is boiled in 10 cc. of a 40% formaldehyde solution until dissolved. The solution is evaporated to dryness. On cooling to room temperature, crystals visible to the naked eye are formed. The crystals disperse light into a spectrum and are readily water soluble.

The reaction products obtained according to Example 1 in liquid form, Example 2 in liquid form, Example 3 in gel form, and Example 4 in crystalline form contain one g. of riboflavin in the form of such a reaction product.

EXAMPLE 5

The present knowledge of riboflavin, i.e. of dimethyl ribityl isoalloxazine, is almost limited to the biological activities of isoalloxazine, also called flavin. Flavin is bound as "yellow enzyme" to proteins thus forming flavoproteins which are present in all living cells and are involved in oxidation of sugars and tissue respiration. This example describes an acidic reaction product obtained by direct reaction of formaldehyde with sugar ribityl derived from the disintegration of riboflavin. The flavin system does not take part in the reaction but is present in the final reaction product for the properties as described above and can be measured by the index of fluorescene.

750 g. of paraformaldehyde containing 95% of formaldehyde are mixed with 250 g. of riboflavin. The solubility of riboflavin increases with higher content of formaldehyde. Hot water is then added to the suspension to yield a volume of 1500 cc., thereby producing a homogenous pasty material containing about 50% of formaldehyde. The mixture is heated to boiling at about 105° C. A transparent orange solution is formed while boiling. The solution is concentrated by evaporation and again diluted with water until the odor of formaldehyde disappears. The final reaction product is diluted to the required volume of 1250 cc. It has a clear orange color, is freely soluble in water, and has a pH-value of about 3.0.

EXAMPLE 6

750 g. of paraformaldehyde containing 95% of formaldehyde are mixed with 250 g. of riboflavin. Hot water is added to the mixture to yield a total volume of 1500 cc. The pasty suspension is boiled and evaporated to one fifth of its volume. It is then diluted twice to the initial volume and concentrated to one fifth of its volume. A dark hard gel is formed on cooling the concentrate to room temperature. The gel is dissolved in water to yield the desired volume of 1250 cc. of a dark transparent solution for the preparation of 125 ampoules, each of 10 cc. containing 2000 "Polonine" units, or the solution is mixed with a flavoring substance and is converted in solid form for therapeutical use.

EXAMPLE 7

750 g. of paraformaldehyde containing 95% of formaldehyde are mixed with 250 g. of riboflavin. Hot water is added to the mixture to yield a volume of 1500 cc. The pasty mixture which becomes a liquid on boiling is evaporated twice to one fifth of its initial volume. The resulting gel is again dissolved in water and the solution is evaporated almost to dryness. On cooling at room temperature, crystals visible to the naked eye are formed. They disperse light into a spectrum which can be seen by a magnifying glass and which are readily soluble in water. The aqueous solution of the crystals scatter light and reflect different colors depending on the angle from which they are viewed. The reaction product in crystalline form may be pulverized and mixed with other substances and may then be processed in solid form for pharmaceutical use. Or it may be dissolved in water to yield 1250 cc. of the solution.

EXAMPLE 8

750 g. of paraformaldehyde containing 95% of formaldehyde are mixed with 100 g. of ribose and treated as described in Example 8. The reaction products are converted into three kinds of preparations:

(a) Liquid form corresponding to the product as obtained in Example 6, (b) Gel corresponding to the product as obtained in Example 7, (c) Crystals corresponding to the product as obtained in Example 8.

The physical and therapeutical properties of these reaction products are similar to those of riboflavin.

EXAMPLE 9

750 g. of paraformaldehyde containing 95% of formaldehyde are mixed with:

8 g. of magnesium sulfate,
1 g. of ferrous sulfate,
10 g. of calcium lactate,
0.5 g. of potassium permanganate,
1 g. of manganese dioxide,
50 g. of citric acid.

The powerful odor of paraformaldehyde of the mixture disappears almost completely. 250 g. of riboflavin and 9 g. of adenine are added to this mixture and are thoroughly mixed therewith. The mixture is activated by exposure to ultraviolet light for about six hours. Hot water is then added to yield a total volume of 1500 cc. After cooling at room temperature, a pasty product is formed which is kept at a temperature close to 4° C. for twelve hours to increase polymerization of formaldehyde. The mixture is again exposed to ultraviolet irradiation for 24 hours. The irradiated product is then heated over a free flame and boiled at a temperature of about 110° C. At the boiling point temperature, the pasty mixture becomes a transparent, orange liquid. After the liquid has been evaporated to form a dark gel, 100 cc. of water are added and the mixture is again evaporated. This procedure of concentration and dilution is repeated once more by adding 500 cc. of water and evaporating the mixture almost to dryness. The resulting reaction product is a black and hard material from which crystals may be obtained by cracking. The reaction product may also be obtained in liquid or gel form, depending on the degree of evaporation, and may be processed to solid or liquid pharmaceutical preparations.

It has been found that the compositions prepared according to Examples 1 to 9 and obtained on reacting riboflavin or ribose with formaldehyde or paraformaldehyde at elevated temperature, are especially beneficial in restoring normal cell metabolism. The theory is advanced that these reaction products enter the protoplasm of the cells. They have a specific affinity to abnormal cells and participate in their metabolic processes. They exhibit the properties of an antimetabolite and have proved of value in the treatment of animal cancer.

In general, it has been found that recovery or improvement in the treatment of neoplastic processes of medium seriousness can be achieved by the administration of one of the above-described preparations in a dose adjusted to the particular case; for, the amount to be administered depends on the amount of malignant cells in the affected animal. To determine the proper dose, a series of doses has been administered. A preferred method consists in the administration of a series of different doses at intervals of one week. It has been found that different doses of the preparation must be given to cure, or at least improve, cancer with multiple metastases. A specific predetermined dose of the preparation is required to convert a specific type of malignant cells to normalcy. That the required specific dose or doses have been given is evidenced by the appearance of pain in the cancer area. The appearance of pain indicates healing process which takes place only with the administration of an adequate dose. Thus the preparation according to this invention may also serve as a diagnostic means to locate cancer. The doses vary from 25 units to 2000 units and differ by 50 units in the treatment of cancer.

The therapeutic standard unit used in administering the reaction products according to this invention is expressed in units which are calculated as described hereinafter. A batch of each reaction product obtained according to the preceding examples contains as many units as are calculated by means of the following formula:

Amounts in mg. of $$\frac{\text{Paraformaldehyde} + \text{riboflavin} + 2.5 \text{ ribose}}{4} = \text{no. of units}$$

Thus the amount of units of the batch according to Example 6 is, for instance:

$$\frac{750{,}000 \text{ mg. paraformaldehyde} + 250{,}000 \text{ mg. riboflavin}}{4} =$$

250,000 units

The theory is advanced that the reaction products according to this invention belong to the group of nucleic acid compounds, called ribonucleosides. It has been found that these reaction products enter the blood stream and penetrate into the malignant cells within a few minutes. The normal cells, however, apparently do not absorb these preparations. The permeability of the malignant cells varies and depends upon the stage and type of the malignant process. The above-described preparations inhibit the enzyme polynucleotide phosphorylase in vivo and in vitro. The inhibition is non-competitive. Its degree of inhibition may serve as a measure of the effectiveness of the preparations according to this invention.

Acute and chronic toxicity tests have been performed with said preparations on different species of animals. Neither toxicity, nor side-effects or contra-indication have been observed. 10,000 units of the preparation given in one single dose have proved to be harmless.

As stated above, the activity of the reaction products may also be determined by its inhibitory effect on the enzyme polynucleotide phosphorylase. The riboflavin-formaldehyde reaction product according to the present invention evidently combines with the enzyme and the resulting inactivation of the enzyme depends on the concentration of said riboflavin-formaldehyde reaction product.

Pharmacological tests with the new preparations according to the present invention were carried out as follows:

Tests on animals

Preliminary tests were performed mainly on spontaneously afflicted cancer animals with the purpose of determining some, if any, effectiveness. The criteria of effectiveness were based on the three characteristic features of cancer growth: weight, survival time, and regression of tumors.

The tests performed on Sarcoma 180 show insufficient effectiveness of the preparation according to this invention due to inadequate testing procedures. They are given hereinafter, however, in order to show that selection of the dosage is of considerable importance to achieve the desired result. According to these tests six Swiss mice were implanted subcutaneously in the axillary region with Sarcoma 180 and six mice were left as control group. The treatment began 24 hours after implantation. The preparation according to this invention was diluted in an alkaline saline solution containing sorbitan mono-oleate polyoxyalkylene derivative sold under the trademark Tween 80 and given in doses of 125 units daily for seven days. All animals were sacrificed on the eighth day. The weight of the tumors of the test animals was 1434 mg. as compared with those of the control animals which was 1781 mg. The results thus show a reduction in tumor weight in the treated animals by 20% over that of the controls. All treated animals survived the test. The low effectiveness is evidently due to the specific solution used which decreases the activity, too high a dosage, and too long lasting an administration of the same dose.

I claim:

1. In a process of producing a reaction product of riboflavin and formaldehyde, the steps which consist of heating to boiling riboflavin in an aqueous formaldehyde solution containing formaldehyde in excess of the equimolecular amount under nonalkaline conditions and the reaction solution having a pH of about 5.0 or less, until the riboflavin is substantially completely dissolved, and substantially completely removing excess formaldehyde from the reaction mixture by repeated concentration by evaporation and dilution with water.

2. The reaction product of riboflavin and formaldehyde obtained according to the process of claim 1.

3. In a process of producing a reaction product of riboflavin, magnesium and formaldehyde, the steps which consist in heating to a temperature of at least boiling temperature riboflavin and a magnesium salt in an aqueous formaldehyde solution containing formaldehyde in excess to the equimolecular amount in an aqueous acidic medium of a pH lower than 5.0 and concentrating by repeatedly evaporating the resulting reaction mixture.

4. The reaction product of riboflavin and formaldehyde according to the process of claim 3.

5. The process according to claim 1, wherein paraformaldehyde is used as formaldehyde yielding reactant.

6. The process according to claim 1, wherein the reaction is carried out under conditions causing the formaldehyde to undergo polymerization to formoses.

References Cited

UNITED STATES PATENTS

| | | | |
|---|---|---|---|
| 2,587,533 | 2/1952 | Schoen et al. | 260—211.3 |
| 2,775,621 | 12/1956 | MacLean et al. | 260—209 |
| 2,956,963 | 10/1960 | Baird | 260—209 |

FOREIGN PATENTS

| | | |
|---|---|---|
| 767,664 | 2/1957 | Great Britain. |

LEWIS GOTTS, Primary Examiner

JOHNNIE R. BROWN, Assistant Examiner

U.S. Cl. X.R.

260—209; 424—252